(12) United States Patent
Guo et al.

(10) Patent No.: US 10,139,713 B2
(45) Date of Patent: Nov. 27, 2018

(54) LIGHT SOURCE SYSTEM AND PROJECTION SYSTEM

(71) Applicant: APPOTRONICS CORPORATION LIMITED, Shenzhen (CN)

(72) Inventors: Zuqiang Guo, Shenzhen (CN); Zeqin Wang, Shenzhen (CN); Fei Hu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/564,180

(22) PCT Filed: Apr. 5, 2016

(86) PCT No.: PCT/CN2016/078423
§ 371 (c)(1),
(2) Date: Oct. 3, 2017

(87) PCT Pub. No.: WO2016/161924
PCT Pub. Date: Oct. 13, 2016

(65) Prior Publication Data
US 2018/0129123 A1 May 10, 2018

(30) Foreign Application Priority Data
Apr. 9, 2015 (CN) .......................... 2015 1 0165863

(51) Int. Cl.
G03B 21/00 (2006.01)
G03B 21/20 (2006.01)
H04N 9/31 (2006.01)

(52) U.S. Cl.
CPC .......... *G03B 21/008* (2013.01); *G03B 21/20* (2013.01); *G03B 21/204* (2013.01); *H04N 9/3158* (2013.01); *H04N 9/3161* (2013.01)

(58) Field of Classification Search
CPC .......................... G03B 21/204; G03B 21/208; G03B 21/2013; G03B 21/2033; G03B 21/2053;
(Continued)

(56) References Cited

U.S. PATENT DOCUMENTS 8,403,492 B2    3/2013  Shibasaki
8,573,779 B2 *  11/2013 Yamagishi ........... G03B 21/204
                                                353/33
(Continued)

FOREIGN PATENT DOCUMENTS

CN          101937162 A          1/2011
CN          102645826 A          8/2012
(Continued)

OTHER PUBLICATIONS

International Search Report in the parent PCT application No. PCT/CN2016/078423, dated Jun. 28, 2016.
(Continued)

*Primary Examiner* — Sultan Chowdhury
(74) *Attorney, Agent, or Firm* — Chen Yoshimura LLP

(57) ABSTRACT

A light source system includes an excitation light source emitting excitation light in at least first and second time intervals; a compensation light source emitting compensation light in at least third time intervals, the compensation light including laser light of at least one color; and a rotating color wheel, including at least first and second regions, the first region generating light of at least two different colors in time sequence under irradiation of the excitation light in the first and second time sequences, and the second region transmitting the compensation light in at least the third time sequence. The light of the at least two different colors includes at least one type of wide-spectrum fluorescence, and the laser compensates for the fluorescence or light split from the fluorescence. The compensation light is directly (Continued)

transmitted without being irradiated upon fluorescent powder, so scattering loss of the compensation light is reduced.

20 Claims, 8 Drawing Sheets

(58) Field of Classification Search
CPC .. H04N 9/3111; H04N 9/3114; H04N 9/3158; H04N 9/3161; H04N 9/3164; H04N 9/3182
See application file for complete search history.

(56) References Cited

U.S. PATENT DOCUMENTS

| | | | |
|---|---|---|---|
| 9,866,807 B2* | 1/2018 | Li | F21V 9/40 |
| 2010/0328554 A1 | 12/2010 | Shibasaki | |
| 2011/0043765 A1* | 2/2011 | Shibasaki | G03B 21/28 |
| | | | 353/31 |
| 2013/0033683 A1 | 2/2013 | Hsu et al. | |
| 2013/0077056 A1* | 3/2013 | Okuda | H04N 9/3105 |
| | | | 353/31 |
| 2013/0088689 A1* | 4/2013 | Lin | G03B 21/204 |
| | | | 353/31 |
| 2014/0071408 A1* | 3/2014 | Takahashi | G02B 27/141 |
| | | | 353/31 |
| 2014/0347634 A1* | 11/2014 | Bommerbach | H04N 9/3158 |
| | | | 353/31 |
| 2015/0253654 A1 | 9/2015 | Hu et al. | |

FOREIGN PATENT DOCUMENTS

| | | |
|---|---|---|
| CN | 102645827 A | 8/2012 |
| CN | 103529631 A | 1/2014 |
| CN | 103713455 A | 4/2014 |
| JP | 2011-100163 A | 5/2011 |
| JP | 2011191602 A | 9/2011 |
| JP | 2013-205648 A | 10/2013 |
| WO | 2014/048287 A | 4/2014 |

OTHER PUBLICATIONS

IPRP in the parent PCT application No. PCT/CN2016/078423, dated Oct. 10, 2017.
Chinese Office Action, dated Jul. 31, 2017, and Search Report dated Jul. 19, 2017, in a counterpart Chinese patent application, No. CN 201510165863.9.
Japanese Office Action, dated Sep. 5, 2018 in a counterpart Japanese patent application, No. JP 2017-552159.

* cited by examiner

LIGHT SOURCE SYSTEM AND PROJECTION SYSTEM

BACKGROUND OF THE INVENTION

Field of the Invention

This invention relates to projection technology, and in particular, it relates to a light source system and projection system.

Description of Related Art

DLP (digital light processing) projection technology uses DMD (digital micromirror device) to achieve display of visible digital information. Current DLP projection system typically uses a single chip DMD or three chip DMD. But because two chip DMD projection system has the advantage of both higher light efficiency and lower cost, they are gaining wider use now.

SUMMARY

Current two chip DMD projection system typically uses a blue laser light to excite a yellow phosphor powder to generate a sequence of blue light and yellow light, and then use a light division and combination prism to divide the yellow light into green light and red light, thereby obtaining the three primary colors of red, green and blue for projection. However, because the green and red lights are obtained by dividing the yellow light, the color coordinates of the red and green lights are somewhat different from the standard color gamut.

To solve this problem, it has been proposed to use laser sources as compensation light sources for two chip DMD projection systems, to make the color coordinates of the red and green lights closer to the standard color gamut. For example, when a red laser light is used as a compensation light, the red laser light and blue laser light are both incident on the yellow phosphor material; because the red laser light cannot excite the yellow phosphor, a mixed light of blue light, yellow light and red laser light is generated. This way, the red laser light compensates for the color gamut of the red light, so that the color coordinates of the red light are closer to the standard color gamut. However, when the red laser or other compensation lights are incident on the phosphor material, the compensation lights are scattered by the phosphor material and some of them is lost, which reduced the utilization efficiency of the compensation lights.

Accordingly, the present invention is directed to a light source system and projection system that solves the problem of low utilization efficiency of the compensation light in the conventional technology.

To achieve the above objects, the present invention provides a light source system, which includes:

an excitation light source for emitting an excitation light during at least first time intervals and second time intervals;

a compensation light source for emitting a compensation light during at least third time intervals, the compensation light emitted by the compensation light source being a laser light including at least one color; and a rotating color wheel, including at least a first region and a second region, wherein during the first time intervals and the second time intervals, the first region is illuminated by the excitation light and converts it to a light sequence including at least two colors, and wherein during the third time intervals, the second region transmits the compensation light;

wherein the light including the at least two colors includes at least a broad band fluorescent light, and wherein the at least one color laser light compensates for the fluorescent light or lights divided from the fluorescent light.

Preferably, a spectral range of the at least one color laser light overlaps partly with a spectral range of the light including at least two colors.

Preferably, the compensation light source includes a first compensation light source and a second compensation light source, the first compensation light source emitting a first compensation light, and the second compensation light source emitting a second compensation light.

Preferably, the system further includes a controller, which controls the excitation light source to turn on during the first time intervals and the second time intervals and turn off during the third time intervals, and controls the compensation light source to turn on during the third time intervals and turn off during the first time intervals and the second time intervals.

Preferably, the first region includes a phosphor segment and a reflective segment, wherein during the first time intervals, the reflective segment reflects the excitation light, wherein during the second time intervals, the phosphor segment generates a yellow converted light under illumination of the excitation light, and wherein during the third time intervals, the second region transmits the first compensation light and the second compensation light.

Preferably, the phosphor segment is a segment carrying a yellow phosphor material, the reflective segment is a segment carrying a scattering powder, and the second region is a transmission type diffusion segment.

Preferably, the excitation light source and the compensation light source are respectively disposed on two sides of the rotating color wheel, the light source system further comprising at least one partially coated filter, disposed between the excitation light source and the rotating color wheel, for reflecting the excitation light, the fluorescent light and the compensation light Preferably, the system further includes a controller, the controller controlling the excitation light source to either turn on during the first time intervals and the second time intervals and turn off during the third time intervals, or to turn on continuously; the controller further controlling the first compensation light source to turn on during the third time intervals and turn off during the first time intervals and the second time intervals, and controlling the second compensation light source to turn on during the second time intervals and the third time intervals and turn off during the first time intervals; or, the controller controlling the second compensation light source to turn on during the third time intervals and turn off during the first time intervals and the second time intervals, and controlling the first compensation light source to turn on during the second time intervals and the third time intervals and turn off during the first time intervals.

Preferably, the excitation light source and the compensation light source are respectively disposed on two sides of the rotating color wheel, the light source system further comprising at least one partially coated filter and a dichroic mirror, the partially coated filter being disposed between the excitation light source and the rotating color wheel, for reflecting the fluorescent light and the compensation light, and the dichroic mirror being disposed between the compensation light source and the rotating color wheel, for transmitting the compensation light and reflecting the excitation light.

Preferably, the first region includes a phosphor segment and a transparent segment, wherein during the first time intervals, the phosphor segment is illuminated by the excitation light to generate a yellow light, wherein during the second time intervals, the transparent segment transmits the excitation light and the first compensation light, or, during the second time intervals, the transparent segment transmits the excitation light and the second compensation light, and wherein during the third time intervals, the second region transmits the first compensation light and the second compensation light.

Preferably, the phosphor segment is a segment that carries a yellow phosphor material, and the transparent segment and the second region are transmission type diffusion segments.

Preferably, the excitation light is a blue light, the first compensation light is a red light, and the second compensation light is a bluish-green light.

A projection system, including any of the above light source system; a light division system for separating different color lights into lights that travel along a plurality of different optical paths, wherein the compensation light and the corresponding color light travel along a same optical path; and a light modulating system including a plurality of light modulators, the plurality of light modulators corresponding one-to-one with the respective optical paths, for modulating lights traveling along the plurality of optical paths.

Preferably, the first region includes a phosphor segment and a reflective segment, wherein during the first time intervals, the light division system sends the reflected excitation light to travel along a second optical path, wherein during the second time intervals, the light division system divides the yellow light into a red light that travels along a first optical path and a green light that travels along the second optical path, and wherein during the third time intervals, the light division system sends the first compensation light to travel along the first optical path and sends the second compensation light to travel along the second optical path.

Preferably, the first region includes a phosphor segment and a transparent segment, wherein the first compensation light source is turned on during the second time intervals and the third time intervals, wherein during the first time interval, the light division system divides the yellow light into a green light that travels along a first optical path and a red light that travels along a second optical path, wherein during the second time intervals, the light division system sends the first compensation light to travel along the second optical path and sends the transmitted excitation light to travel along the first optical path, and wherein during the third time intervals, the light division system sends the first compensation light to travel along the second optical path and sends the second compensation light to travel along the first optical path.

Preferably, the first region includes a phosphor segment and a transparent segment, wherein the second compensation light source is turned on during the second time intervals and the third time intervals, wherein during the first time interval, the light division system divides the yellow light into a red light that travels along a first optical path and a green light that travels along a second optical path, wherein during the second time intervals, the light division system sends the transmitted excitation light to travel along the first optical path and sends the second compensation light to travel along the second optical path, and wherein during the third time intervals, the light division system sends the first compensation light to travel along the first optical path and sends the second compensation light to travel along the second optical path.

Preferably, the light modulating system includes a first light modulator and a second light modulator, wherein the first light modulator is disposed to modulate lights traveling along the first optical path and the second light modulator is disposed to modulate lights traveling along the second optical path.

Preferably, the first region includes a phosphor segment and a transparent segment, wherein the first compensation light source is turned on during the second time intervals and the third time intervals, wherein during the first time interval, the light division system divides the yellow light into a green light that travels along a first optical path and a red light that travels along a second optical path and sends the excitation light to travel along a third optical path, wherein during the second time intervals, the light division system sends the first compensation light to travel along the second optical path and sends the transmitted excitation light to travel along the first optical path and the third optical path, and wherein during the third time intervals, the light division system sends the first compensation light to travel along the second optical path, sends the second compensation light to travel along the first optical path, and sends the transmitted excitation light to travel along the third optical path.

Preferably, the first region includes a phosphor segment and a transparent segment, wherein the second compensation light source is turned on during the second time intervals and the third time intervals, wherein during the first time interval, the light division system divides the yellow light into a red light that travels along a first optical path and a green light that travels along a second optical path and sends the excitation light to travel along a third optical path, wherein during the second time intervals, the light division system sends the transmitted excitation light to travel along the first optical path and the third optical path and sends the second compensation light to travel along the second optical path, and wherein during the third time intervals, the light division system sends the first compensation light to travel along the first optical path, sends the second compensation light to travel along the second optical path, and sends the transmitted excitation light to travel along the third optical path.

Preferably, the light modulating system includes a first light modulator, a second light modulator and a third light modulator, wherein the first light modulator is disposed to modulate lights traveling along the first optical path, the second light modulator is disposed to modulate lights traveling along the second optical path, and the third light modulator is disposed to modulate lights traveling along the third optical path.

Compared to conventional technology, embodiments of the present invention have the following advantages:

In the light source system and projection system of the embodiments, the rotating color wheel includes a first region and a second region, the first region generates a sequence of light containing at least two different colors when illuminated by the excitation light, and the second region transmits the compensation lights. This allows the compensation lights and the light of different colors to be combined to form projected image. The compensation lights are not illuminated on the phosphor, but are directly transmitted, so that the scattering loss of the compensation lights is reduced, and the utilization efficiency of the compensation lights is increased.

BRIEF DESCRIPTION OF THE DRAWINGS

To more clearly describe embodiments of the present invention or the conventional technology, the drawings used in to describe the embodiments or conventional technology are briefly described below. These drawings illustrate embodiments of the present invention, and those of ordinary skill in the relevant art can construct other drawings based on the described drawings without creative work.

FIG. 1 schematically illustrates the structure of a light source system according to a first embodiment of the present invention.

DETAILED DESCRIPTION OF PREFERRED EMBODIMENTS

Embodiments of the present invention are described clearly and fully below with reference to the drawings. These embodiments are only some of the embodiments of the present invention, and are not all of the embodiments. Based on the described embodiments, those of ordinary skill in the art can obtain other embodiments without creative work, and such embodiments are also within the scope of the present invention.

First Embodiment

Figure 1:
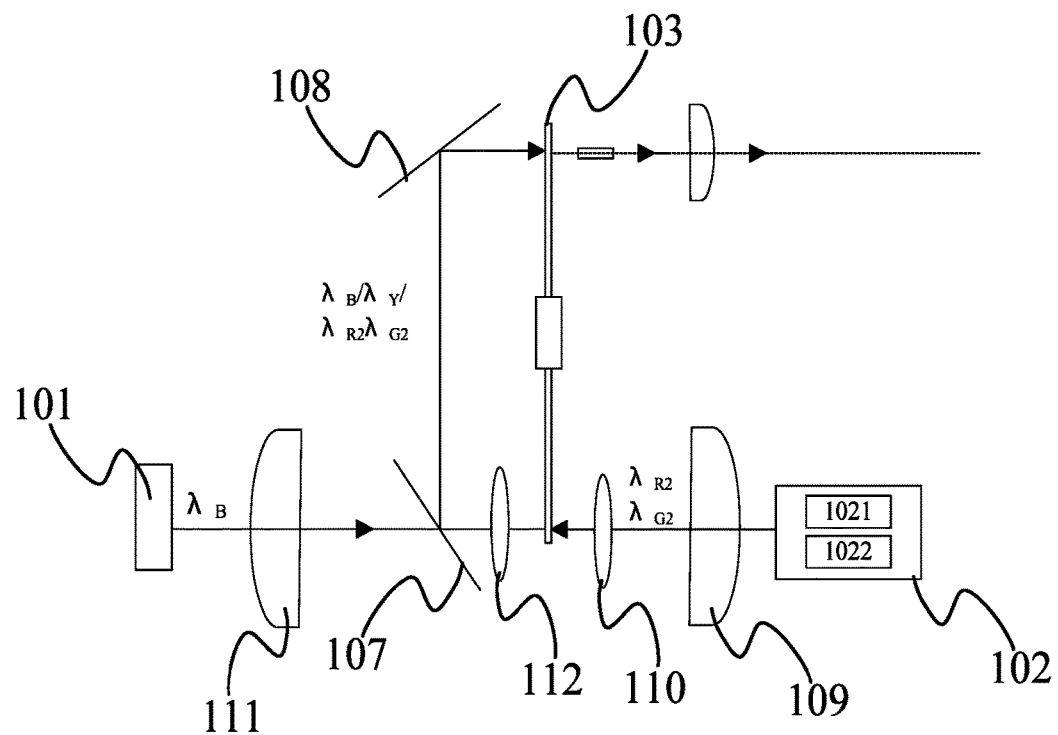

This embodiment provides a light source system. As shown in FIG. 1, the light source system includes an excitation light source 101, a compensation light source 102, and a rotating color wheel 103. The excitation light source 101 is preferably a semiconductor laser that emits a blue light of a wavelength of 445 nm. The excitation light source 101 emits an excitation light during at least first time intervals and second time intervals, and the compensation light source 102 emits a compensation light during at least third time intervals. The compensation light includes at least one color laser light. The rotating color wheel 103 includes at least a first region and a second region. During the first time intervals and the second time intervals, the first region is illuminated by the excitation light and sequentially generates a light containing at least two color components; during at least the third time intervals, the second region transmits the compensation light. The light containing at least two color components includes at least a broad band fluorescent light, in the spectral range of 480-700 nm. The at least one color laser light is used to compensate for the fluorescent light or lights divided from the fluorescent light.

As shown in FIG. 1, the excitation light source 101 and the compensation light source 102 are respectively disposed on the two sides of the rotating color wheel 103. The light source system further includes at least one partially coated (i.e. partial-area coated) filter, preferably including a partially coated filter 107 and a reflecting mirror 108. The partially coated filter 107 is disposed between the excitation light source 101 and the rotating color wheel 103, for reflecting the excitation light, the converted light and the compensation light to the reflecting mirror 108. The reflecting mirror 108 reflects the excitation light, the converted light and the compensation light. Further, the light source system also includes a collimating lens 109 and a collecting lens 110 sequentially disposed between the compensation light source 102 and the rotating color wheel 103, a collimating lens 111 disposed between the partially coated filter 107 and the excitation light source 101, and a collecting lens 112 disposed between the partially coated filter 107 and the rotating color wheel 103.

In this embodiment, the compensation light source 102 includes a first compensation light source 1021 and a second compensation light source 1022. The first compensation light source 1021 emits a first compensation light, and the second compensation light source 1022 emits a second compensation light. In this embodiment, the first compensation light is preferably a red light having a dominant wavelength of 638 nm, and the second compensation light is preferably a bluish-green light having a dominant wavelength of 520 nm, but the invention is not limited to these colors, so long as the spectral ranges of the compensation lights have partial overlap with the spectral ranges the above different color lights being compensated. The first compensation light source 1021 and the second compensation light source 1022 are preferably semiconductor lasers or light emitting diodes.

Figure 2:
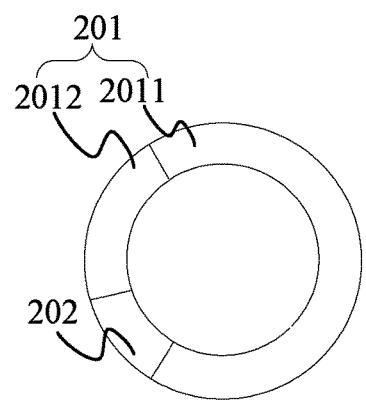
FIG. 2 schematically illustrates the structure of a rotating color wheel according to the first embodiment of the present invention.

In this embodiment, as shown in FIG. 2, the rotating color wheel 103 includes a first region 201 and a second region 202. The first region 201 includes a phosphor segment 2011 and a reflective segment 2012. During the first time intervals, the reflective segment 2012 reflects the excitation light. During the second time intervals, the phosphor segment 2011 generates a yellow converted light under the illumination of the excitation light. During the third time intervals, the second region 202 transmits the first compensation light and the second compensation light. The phosphor segment 2011 is a segment carrying a yellow phosphor material; the reflective segment 2012 is a segment carrying a scattering powder; and the second region 202 is a transmission type diffusion segment.

In this embodiment, during the first time intervals, the excitation light $\lambda_B$ emitted by the excitation light source 101 sequentially passes through the collimating lens 111, the partially coated filter 107 and the collecting lens 112 to be incident on the reflective segment 2012 of the rotating color wheel 103. The reflective segment 2012 reflects the excitation light $\lambda_B$ to the partially coated filter 107. This excitation light, i.e. blue light $\lambda_B$, is reflected by the partially coated filter 107 and the reflecting mirror 108 into the light division system. During the second time intervals, the excitation light $\lambda_B$ emitted by the excitation light source 101 is incident on the phosphor segment 2011 of the rotating color wheel 103, and the yellow phosphor material on the phosphor segment 2011 absorbs the excitation light $\lambda_B$ to generate a yellow converted light $\lambda_Y$. The yellow light $\lambda_Y$ is reflected by the partially coated filter 107 and the reflecting mirror 108 into the light division system. During the third time intervals, the first compensation light $\lambda_{R2}$ generated by the first compensation light source 1021 and the second compensation light $\lambda_{G2}$ generated by the second compensation light source 1022 are incident on the second region 202 of the rotating color wheel 103. They are transmitted by the second region 202, and then incident on the partially coated filter 107. The first compensation light, i.e. the red light $\lambda_{R2}$, and the second compensation light, i.e. the bluish-green light $\lambda_{G2}$, are reflected by the partially coated filter 107 and the reflecting mirror 108 into the light division system. The light division system separates the different color lights into different optical paths, such that the different color lights are modulated by different light modulators, and the modulated light are then combined to form a projected image.

The light source system of this embodiment further includes a controller, to control the excitation light source 101 to turn on during the first time intervals and the second time intervals, and turn off during the third time intervals; and to control the compensation light source 102 to turn on during the third time intervals and turn off during the first time intervals and the second time intervals.

It can be seen that the red light $\lambda_{R1}$ and the red light $\lambda_{R2}$ are mixed in a time-interval-based mixing, which enhances the gamut of the red color. Similarly, the bluish-green light $\lambda_{G2}$ and the green light $\lambda_{G1}$ are mixed in a time-interval-based mixing, which enhances the gamut of the green color. This way, the combined projected image can better satisfy the DCI (Digital Copyright Identifier) standard and the REC.709 standard. Moreover, for different projectors, their color coordinates can be corrected to be close to the green color coordinates and red color coordinates of the DCI standard and REC.709 standard, so the color gamut of different projectors can be made consistent.

In the light source system of this embodiment, the compensation lights are transmitted through the second region and are mixed with the different color lights to form the projected image. This way, the compensation lights are not illuminated on the phosphor material, but are directly transmitted. Thus, while correcting the color gamut of the projected image, the scattering loss of the compensation lights is also reduced, so that the utilization efficiency of the compensation lights is increased.

Second Embodiment

Figure 3:
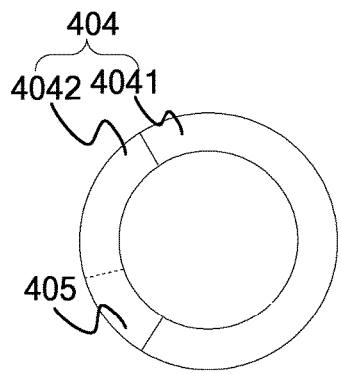
FIG. 3 schematically illustrates the structure of a rotating color wheel according to the second embodiment of the present invention.

This embodiment provides a light source system. The light source system of this embodiment is similar to that of the first embodiment, with the following differences. In this embodiment, the rotating color wheel 403, as shown in FIG. 3, includes a first region 404 and a second region 405; the first region 404 includes phosphor segment 4041 and transparent segment 4042. During the first time intervals, the phosphor segment 4041 is illuminated by the excitation light to generate a yellow light. During the second time intervals, the transparent segment 4042 transmits the excitation light and the first compensation light, or, during the second time intervals, the transparent segment 4042 transmits the excitation light and the second compensation light. During the third time intervals, the second region 405 transmits the first compensation light and the second compensation light. More specifically, the phosphor segment 4041 is a segment that carries a yellow phosphor material; the transparent segment 4042 and the second region 405 are transmission type diffusion segments.

Figure 4:
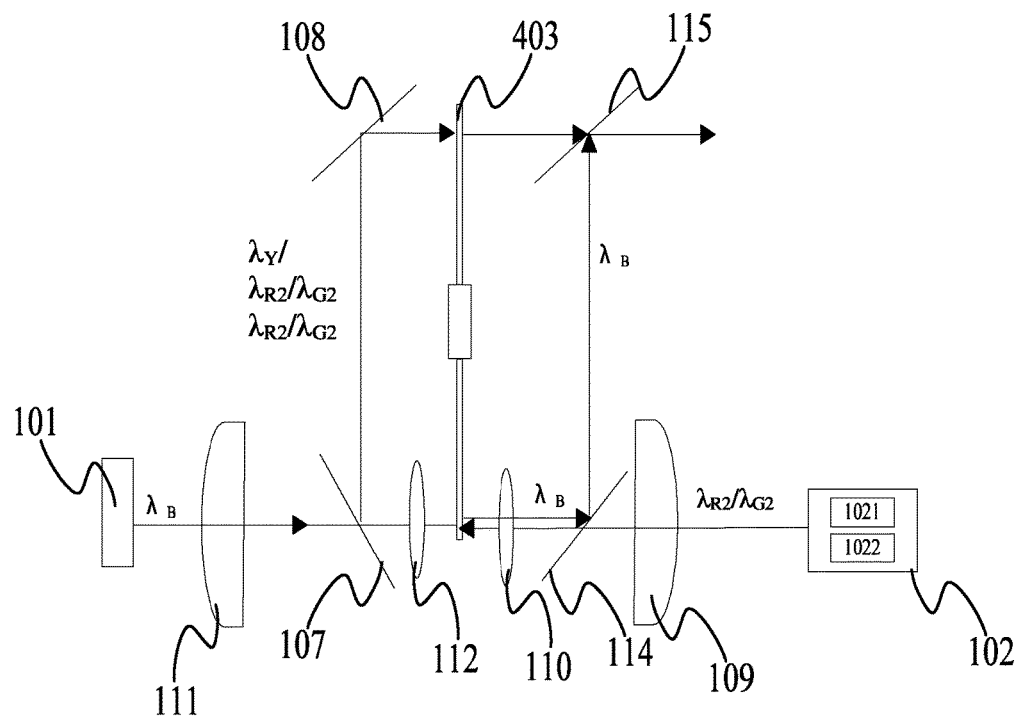
FIG. 4 schematically illustrates the structure of a light source system according to a second embodiment of the present invention.

As shown in FIG. 4, the light source system of this embodiment further includes at least one dichroic mirror, such as dichroic mirrors 114 and 115. The dichroic mirror 114 is disposed between compensation light source 102 and the rotating color wheel 403, for transmitting the compensation lights and reflecting the excitation light. The dichroic mirror 115 transmits the compensation lights and converted light, and reflects the excitation light.

In this embodiment, during the first time intervals, the excitation light $\lambda_B$ emitted by the excitation light source 101 sequentially passes through the collimating lens 111, the partially coated filter 107 and the collecting lens 112 to be incident on the phosphor segment 4041 of the rotating color wheel 403. The yellow phosphor material on the phosphor segment 4041 absorbs the excitation light $\lambda_B$ to generate a yellow converted light $\lambda_Y$. The yellow light $\lambda_Y$ is reflected by the partially coated filter 107 and the reflecting mirror 108 into the light division system. During the second time intervals, the excitation light $\lambda_B$ emitted by the excitation light source 101 is incident on the transparent segment 4042 of the rotating color wheel 403. This excitation light, i.e. the blue light $\lambda_B$, passes through the rotating color wheel 403, and is reflected by the dichroic mirrors 114 and 115 into the light division system. Also, during the second time intervals, the first compensation light $\lambda_{R2}$ generated by the first compensation light source 1021 passes through the dichroic mirror 114 to be incident on the transparent segment 4042 of the rotating color wheel 403. The first compensation light $\lambda_{R2}$ passes through the rotating color wheel 403, and is reflected by the partially coated filter 107 and the reflecting mirror 108 into the light division system. During the third time intervals, the first compensation light $\lambda_{R2}$ generated by the first compensation light source 1021 and the second compensation light $\lambda_{G2}$ generated by the second compensation light source 1022 are incident on the second region 405 of the rotating color wheel 403. They are transmitted by the second region 405, and then incident on the partially coated filter 107. The first compensation light, i.e. the red light $\lambda_{R2}$, and the second compensation light, i.e. the bluish-green light $\lambda_{G2}$, are reflected by the partially coated filter 107 and the reflecting mirror 108 into the light division system. The light division system separates the different color lights into different optical paths, such that the different color lights are modulated by different light modulators, and the modulated light are then combined to form a projected image.

The light source system of this embodiment further includes a controller, to control the excitation light source 101 to either turn on continuously, or turn on during the first time intervals and the second time intervals and turn off during the third time intervals; to control the second compensation light source 1022 to turn on during the third time intervals and turn off during the first time intervals and the second time intervals; and to control the first compensation light source 1021 to turn on during the second time intervals and the third time intervals and turn off during the first time intervals.

In another embodiment, the controller controls the excitation light source 101 to either turn on continuously, or turn on during the first time intervals and the second time intervals and turn off during the third time intervals; controls the first compensation light source 1021 to turn on during the third time intervals and turn off during the first time intervals and the second time intervals; and controls the second compensation light source 1022 to turn on during the second time intervals and the third time intervals and turn off during the first time intervals.

In the light source system of this embodiment, the first compensation light compensates the red color gamut, and the second compensation light compensates the green color gamut. Further, the compensation lights are not illuminated on the phosphor material, but are directly transmitted. Thus, while correcting the color gamut of the projected image, the scattering loss of the compensation lights is also reduced, so that the utilization efficiency of the compensation lights is increased.

Third Embodiment

Figure 5:
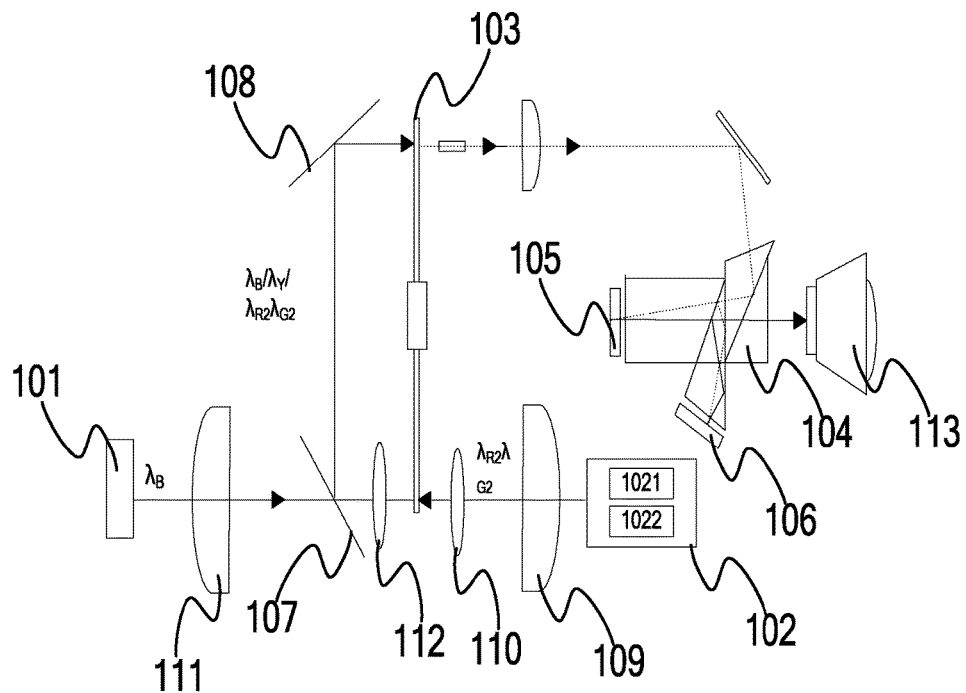
FIG. 5 schematically illustrates the structure of a projection system according to a third embodiment of the present invention.

This embodiment provides a projection system. As shown in FIG. 5, the projection system includes an excitation light source 101, a compensation light source 102, a rotating color wheel 103, a light division system 104, a first light modulator 105 and a second light modulator 106. The excitation light source 101 is preferably a semiconductor laser that emits a blue light of a wavelength of 445 nm. The excitation light source 101 emits an excitation light during at least first time intervals and second time intervals, and the compensation light source 102 emits a compensation light during at least third time intervals. The rotating color wheel 103 includes at least a first region and a second region. During the first time intervals and the second time intervals, the first region is illuminated by the excitation light and sequentially generates a light containing at least two different color components; during at least the third time intervals, the second region transmits the compensation light, so the compensation light and the different color component lights are combined to form projected images. The light division system 104 separates different color lights into a light travelling along a first optical path and a light travelling along a second optical path, so that the compensation light travels along the same optical path as the corresponding color light. The light modulation system of this embodiment includes the first light modulator 105 and the second light modulator 106. The first light modulator 105 modulates the light travelling along the first optical path, and the second light modulator 106 modulates the light travelling along the second optical path.

As shown in FIG. 5, the excitation light source 101 and the compensation light source 102 are respectively disposed on the two sides of the rotating color wheel 103. The projection system further includes at least one partially coated filter, preferably including a partially coated filter 107 and a reflecting mirror 108. The partially coated filter 107 is disposed between the excitation light source 101 and the rotating color wheel 103, for reflecting the excitation light, the converted light and the compensation light to the reflecting mirror 108. The reflecting mirror 108 reflects the excitation light, the converted light and the compensation light to the light division system 104. Further, the light source system also includes a collimating lens 109 and a collecting lens 110 sequentially disposed between the compensation light source 102 and the rotating color wheel 103, a collimating lens 111 disposed between the partially coated filter 107 and the excitation light source 101, and a collecting lens 112 disposed between the partially coated filter 107 and the rotating color wheel 103.

In this embodiment, the compensation light source 102 includes a first compensation light source 1021 and a second compensation light source 1022. The first compensation light source 1021 emits a first compensation light, and the second compensation light source 1022 emits a second compensation light. In this embodiment, the first compensation light is preferably a red light having a dominant wavelength of 638 nm, and the second compensation light is preferably a bluish-green light having a dominant wavelength of 520 nm, but the invention is not limited to these colors, so long as the spectral ranges of the compensation lights have partial overlap with the spectral ranges the above different color lights being compensated. The first compensation light source 1021 and the second compensation light source 1022 are preferably semiconductor lasers or light emitting diodes.

In this embodiment, as shown in FIG. 2, the rotating color wheel 103 includes a first region 201 and a second region 202. The first region 201 includes a phosphor segment 2011 and a reflective segment 2012. During the first time intervals, the reflective segment 2012 reflects the excitation light. During the second time intervals, the phosphor segment 2011 generates a yellow converted light under the illumination of the excitation light. During the third time intervals, the second region 202 transmits the first compensation light and the second compensation light. The phosphor segment 2011 is a segment carrying a yellow phosphor material; the reflective segment 2012 is a segment carrying a scattering powder; and the second region 202 is a transmission type diffusion segment.

In this embodiment, during the first time intervals, the excitation light $\lambda_B$ emitted by the excitation light source 101 sequentially passes through the collimating lens 111, the partially coated filter 107 and the collecting lens 112 to be incident on the reflective segment 2012 of the rotating color wheel 103. The reflective segment 2012 reflects the excitation light $\lambda_B$ to the partially coated filter 107. This excitation light, i.e. the blue light $\lambda_B$, is reflected by the partially coated filter 107 and the reflecting mirror 108 into the light division system 104. During the second time intervals, the excitation light $\lambda_B$ emitted by the excitation light source 101 is incident on the phosphor segment 2011 of the rotating color wheel 103, and the yellow phosphor material on the phosphor segment 2011 absorbs the excitation light $\lambda_B$ to generate a yellow converted light $\lambda_Y$. The yellow light $\lambda_Y$ is reflected by the partially coated filter 107 and the reflecting mirror 108 into the light division system 104. During the third time intervals, the first compensation light $\lambda_{R2}$ generated by the first compensation light source 1021 and the second compensation light $\lambda_{G2}$ generated by the second compensation light source 1022 are incident on the second region 202 of the rotating color wheel 103. They are transmitted by the second region 202, and then incident on the partially coated filter 107. The first compensation light, i.e. the red light $\lambda_{R2}$, and the second compensation light, i.e. the bluish-green light $\lambda_{R2}$, are reflected by the partially coated filter 107 and the reflecting mirror 108 into the light division system 104.

Figure 6:
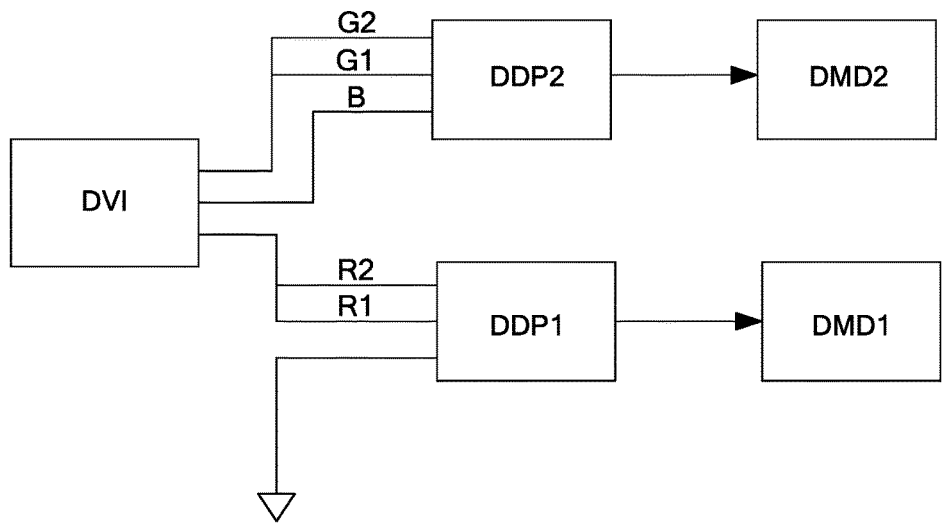
FIG. 6 schematically illustrates a control principle of the first light modulator and second light modulator of the third embodiment.

During the first time intervals, the light division system 104 sends the reflected excitation light, i.e. the blue light $\lambda_B$, to travel along the second optical path, so that the second light modulator 106 modulates the blue light $\lambda_B$. Because the first light modulator 105 is idle during the first time intervals, the first light modulator 105 may be grounded during the first time intervals, as shown in FIG. 6, the signal decoder DVI decodes the source signal and outputs RGB signals of individual image frames, so that the processor DDP1 and the digital micromirror devices DMD1 of the first light modulator 105 and the processor DDP2 and the digital micromirror devices DMD2 of the first light modulator 106 respectively modulate the corresponding color lights outputted by the light source system. During the second time intervals, the light division system 104 divides the yellow light $\lambda_Y$ into a red light $\lambda_{R1}$ that travels along the first optical path and a green light $\lambda_{G1}$ that travels along the second optical path, so that the first light modulator 105 modulates the red light $\lambda_{R1}$ and the second light modulator 106 modulates the green light $\lambda_{G1}$. During the third time intervals, the light division system 104 sends the first compensation light, i.e. the red light $\lambda_{R2}$, to travel along the first optical path, and sends the second compensation light, i.e. the bluish-green light $\lambda_{G2}$, to travel along the second optical path, so that the first light modulator 105 modulates the red light $\lambda_{R2}$ and the second light modulator 106 modulates the bluish-green light $\lambda_{G2}$. The modulated blue light $\lambda_B$, red light $\lambda_{R1}$, green light $\lambda_{G1}$, red light $\lambda_{R2}$, and bluish-green light $\lambda_{G2}$ are combined to form the image which is projected onto a screen by a projection lens 113.

Figure 7:
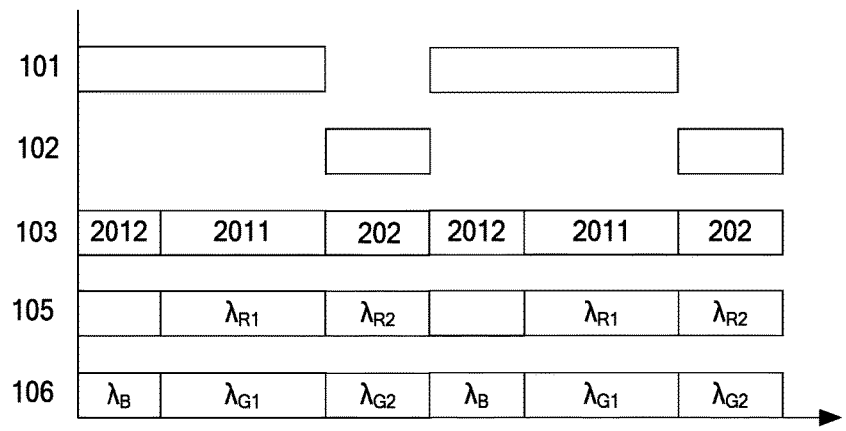
FIG. 7 is a timing diagram of the excitation light source, compensation light sources, rotating color wheel, first light modulator and second light modulator of the third embodiment.

The projection system of this embodiment further includes a controller, to control the excitation light source 101 to turn on during the first time intervals and the second time intervals, and turn off during the third time intervals; and to control the compensation light source 102 to turn on during the third time intervals and turn off during the first time intervals and the second time intervals. The timing sequence of the turning on and off of the excitation light source 101 and the compensation light source 102, the timing sequence of the various segments of the rotating color wheel 103, and the timing sequence of the modulation of the first light modulator 105 and the second light modulator 106 are shown in FIG. 7.

Figure 8:
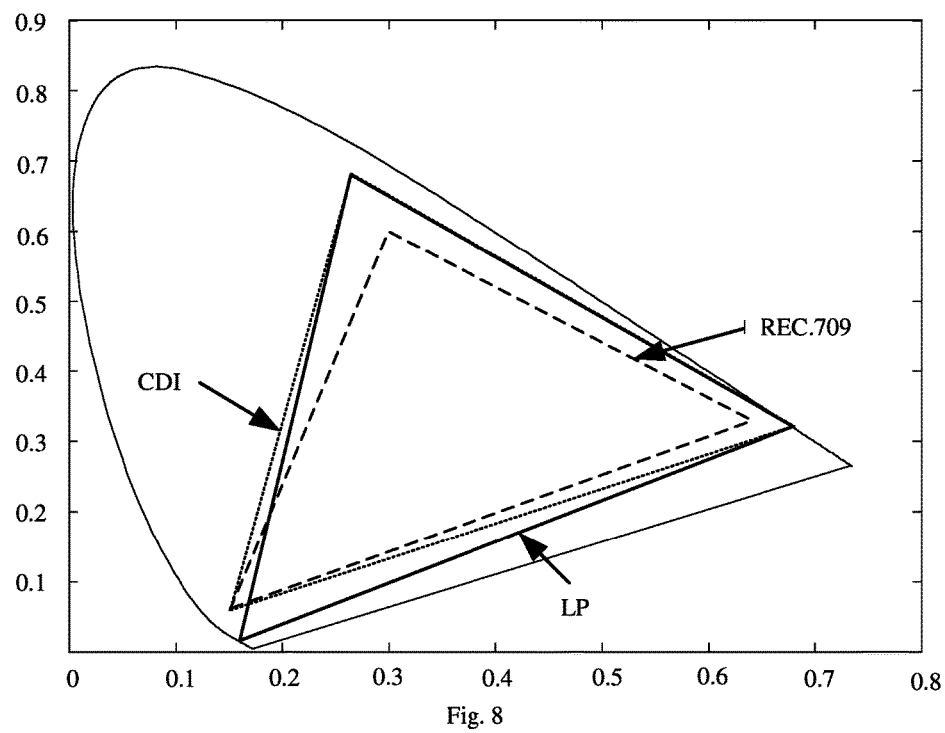
FIG. 8 shows the color gamut of the projected image generated by the projection system of the third embodiment.

It can be seen that the red light $\lambda_{R1}$ and the red light $\lambda_{R2}$ are mixed in a time-interval-based mixing. When the signal inputted to the first light modulator 105 is the same, the first light modulator 105 will synchronously modulate the red light $\lambda_{R1}$ and the red light $\lambda_{R2}$ according to grayscale, which enhances the gamut of the red color. Similarly, the bluish-green light $\lambda_{G2}$ and the green light $\lambda_{G1}$ are mixed in a time-interval-based mixing. When the signal inputted to the second light modulator 106 is the same, the second light modulator 106 will synchronously modulate the bluish-green light $\lambda_{G2}$ and the green light $\lambda_{G1}$ according to grayscale, which enhances the gamut of the green color. This way, the combined projected image can better satisfy the DCI (Digital Copyright Identifier) standard and the REC.709 standard. Moreover, for different projectors, their color coordinates can be corrected to close to the green color coordinates and red color coordinates of the DCI standard and REC.709 standard, so the color gamut of different projectors can be made consistent. FIG. 8 shows the color gamut of the projected image LP after compensation correction according to this embodiment.

In the projection system of this embodiment, the compensation lights are transmitted through the second region and are mixed with the different color lights to form the projected image. This way, the compensation lights are not illuminated on the phosphor material, but are directly transmitted. Thus, while correcting the color gamut of the projected image, the scattering loss of the compensation lights is also reduced, so that the utilization efficiency of the compensation lights is increased.

Fourth Embodiment

This embodiment provides a projection system. The projection system of this embodiment is similar to that of the third embodiment, with the following differences. In this embodiment, the rotating color wheel 403, as shown in FIG. 3, includes a first region 404 and a second region 405; the first region 404 includes phosphor segment 4041 and transparent segment 4042. During the first time intervals, the phosphor segment 4041 is illuminated by the excitation light to generate a yellow light. During the second time intervals, the transparent segment 4042 transmits the excitation light and the first compensation light, or, during the second time intervals, the transparent segment 4042 transmits the excitation light and the second compensation light. During the third time intervals, the second region 405 transmits the first compensation light and the second compensation light. More specifically, the phosphor segment 4041 is a segment that carries a yellow phosphor material; the transparent segment 4042 and the second region 405 are transmission type diffusion segments.

Figure 9:
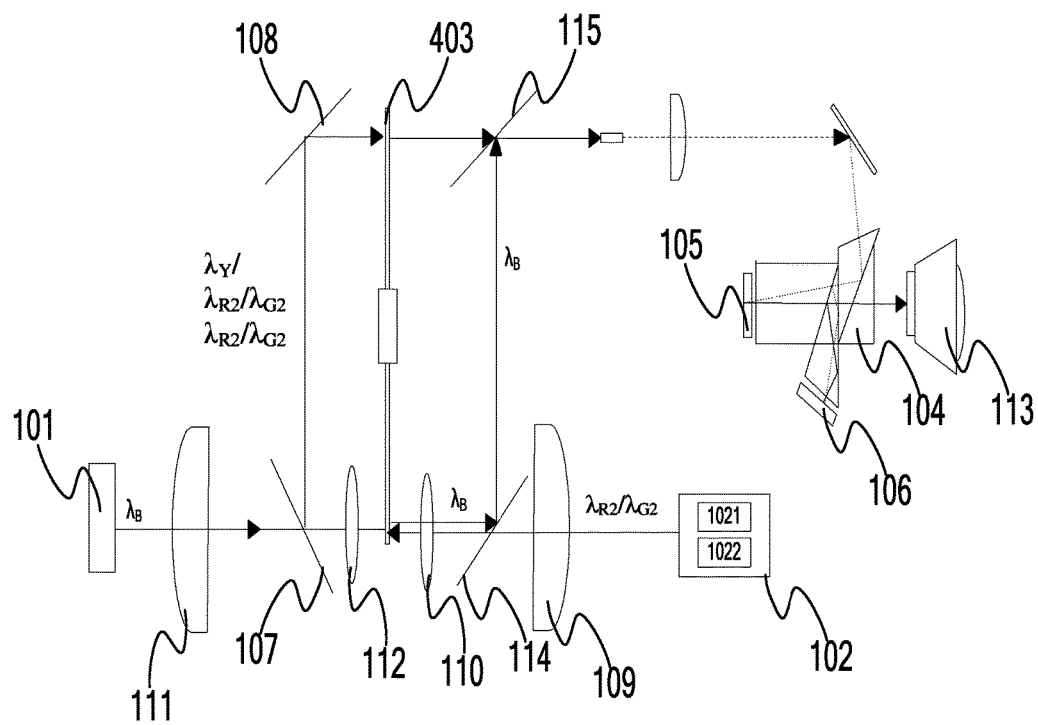
FIG. 9 schematically illustrates the structure of a projection system according to a fourth embodiment of the present invention.

As shown in FIG. 9, the projection system of this embodiment further includes at least one dichroic mirror, such as dichroic mirrors 114 and 115. The dichroic mirror 114 is disposed between compensation light source 102 and the rotating color wheel 403, for transmitting the compensation lights and reflecting the excitation light. The dichroic mirror 115 transmits the compensation lights and converted light, and reflects the excitation light.

In this embodiment, during the first time intervals, the excitation light $\lambda_B$ emitted by the excitation light source 101 sequentially passes through the collimating lens 111, the partially coated filter 107 and the collecting lens 112 to be incident on the phosphor segment 4041 of the rotating color wheel 403. The yellow phosphor material on the phosphor segment 4041 absorbs the excitation light $\lambda_B$ to generate a yellow converted light $\lambda_Y$. The yellow light $\lambda_Y$ is reflected by the partially coated filter 107 and the reflecting mirror 108 into the light division system 104. During the second time intervals, the excitation light $\lambda_B$ emitted by the excitation light source 101 is incident on the transparent segment 4042 of the rotating color wheel 403. This excitation light, i.e. the blue light $\lambda_B$, passes through the rotating color wheel 403, and is reflected by the dichroic mirrors 114 and 115 into the light division system 104. Also, during the second time intervals, the first compensation light $\lambda_{R2}$ generated by the first compensation light source 1021 passes through the dichroic mirror 114 to be incident on the transparent segment 4042 of the rotating color wheel 403. The first compensation light $\lambda_{R2}$ passes through the rotating color wheel 403, and is reflected by the partially coated filter 107 and the reflecting mirror 108 into the light division system 104. During the third time intervals, the first compensation light $\lambda_{R2}$ generated by the first compensation light source 1021 and the second compensation light $\lambda_{G2}$ generated by the second compensation light source 1022 are incident on the second region 405 of the rotating color wheel 403. They are transmitted by the second region 405, and then incident on the partially coated filter 107. The first compensation light, i.e. the red light $\lambda_{R2}$, and the second compensation light, i.e. the bluish-green light $\lambda_{G2}$, are reflected by the partially coated filter 107 and the reflecting mirror 108 into the light division system 104.

Figure 10:
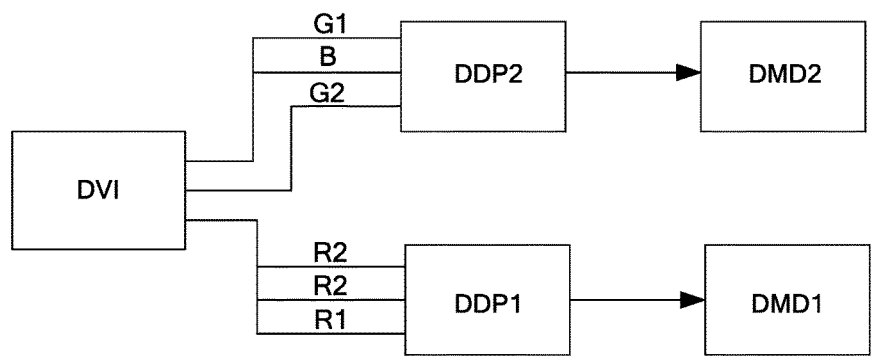
FIG. 10 schematically illustrates a control principle of the first light modulator and the second light modulator of the fourth embodiment.

During the first time intervals, the light division system 104 divides the yellow light $\lambda_Y$ into the red light $\lambda_{R1}$ that travels along the first optical path and the green light $\lambda_{G1}$ that travels along the second optical path, so that the first light modulator 105 modulates the red light $\lambda_{R1}$ and the second light modulator 106 modulates the green light $\lambda_{G1}$. During the second time intervals, the light division system 104 sends the first compensation light, i.e. the red light $\lambda_{R2}$, to travel along the first optical path, and sends the reflected excitation light, i.e. the blue light $\lambda_B$, to travel along the second optical path, so that the first light modulator 105 modulates the red light $\lambda_{R2}$ and the second light modulator 106 modulates the blue light $\lambda_B$. During the third time intervals, the light division system 104 sends the first compensation light, i.e. the red light $\lambda_{R2}$, to travel along the first optical path, and sends the second compensation light, i.e. the bluish-green light $\lambda_{G2}$, to travel along the second optical path, so that the first light modulator 105 modulates the red light $\lambda_{R2}$ and the second light modulator 106 modulates the bluish-green light $\lambda_{G2}$. The modulated blue light $\lambda_B$, red light $\lambda_{R1}$, green light $\lambda_{G1}$, red light $\lambda_{R2}$, and bluish-green light $\lambda_{G2}$ are combined to form the image which is projected onto a screen by a projection lens 113. The control methods for the first light modulator 105 and the second light modulator 106 are shown in FIG. 10.

Figure 11:
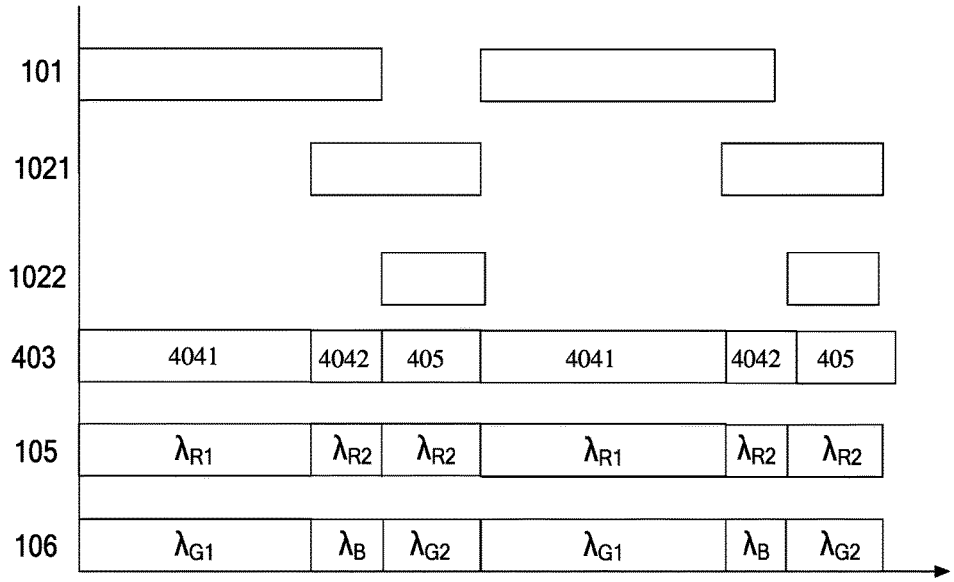
FIG. 11 is a timing diagram of the excitation light source, compensation light sources, rotating color wheel, first light modulator and second light modulator of the fourth embodiment.

The projection system of this embodiment further includes a controller, to control the excitation light source 101 to turn on during the first time intervals and the second time intervals and turn off during the third time intervals; to control the second compensation light source to turn on during the third time intervals and turn off during the first time intervals and the second time intervals; and to control the first compensation light source to turn on during the second time intervals and the third time intervals and turn off during the first time intervals. The timing sequence of the turning on and off of the excitation light source 101, the first compensation light source 1021 and the second compensation light source 1022, the timing sequence of the various segments of the rotating color wheel 103, and the timing sequence of the modulation of the first light modulator 105 and the second light modulator 106 are shown in FIG. 11.

Figure 12:
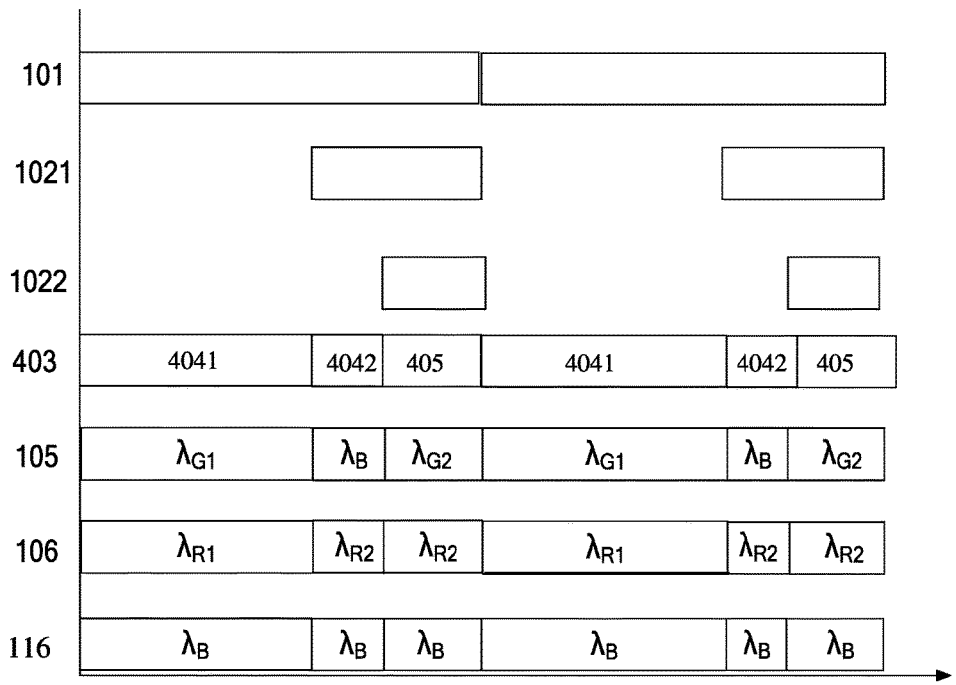
FIG. 12 is a timing diagram of the excitation light source, compensation light sources, rotating color wheel, first light modulator, second light modulator and third light modulator of the fourth embodiment.

In another embodiment, the controller controls the excitation light source 101 to turn on continuously. During the first time intervals, the light division system 104 divides the yellow light $\lambda_Y$ into the green light $\lambda_{G1}$ that travels along the first optical path and the red light $\lambda_{R1}$ that travels along the second optical path, and sends the excitation light $\lambda_B$ to travel along the a third optical path. During the second time intervals, the light division system 104 sends the first compensation light, i.e. the red light $\lambda_{R2}$, to travel along the second optical path, and sends the transmitted excitation light 80 $_B$ to travel along the first and third optical paths. During the third time intervals, the light division system 104 sends the first compensation light, i.e. the red light $\lambda_{R2}$, to travel along the second optical path, sends the second compensation light, i.e. the bluish-green light $\lambda_{G2}$, to travel along the first optical path, and sends the transmitted excitation light $\lambda_B$ to travel along the third optical path. The light modulation system includes a first light modulator 105, a second light modulator 106, and a third light modulator 116. The first light modulator 105 modulates the lights traveling along the first optical path, the second light modulator 106 modulates the lights traveling along the second optical path, and the third light modulator 116 modulates the lights traveling along the third optical path; the modulation timing sequences are as shown in FIG. 12.

Figure 13:
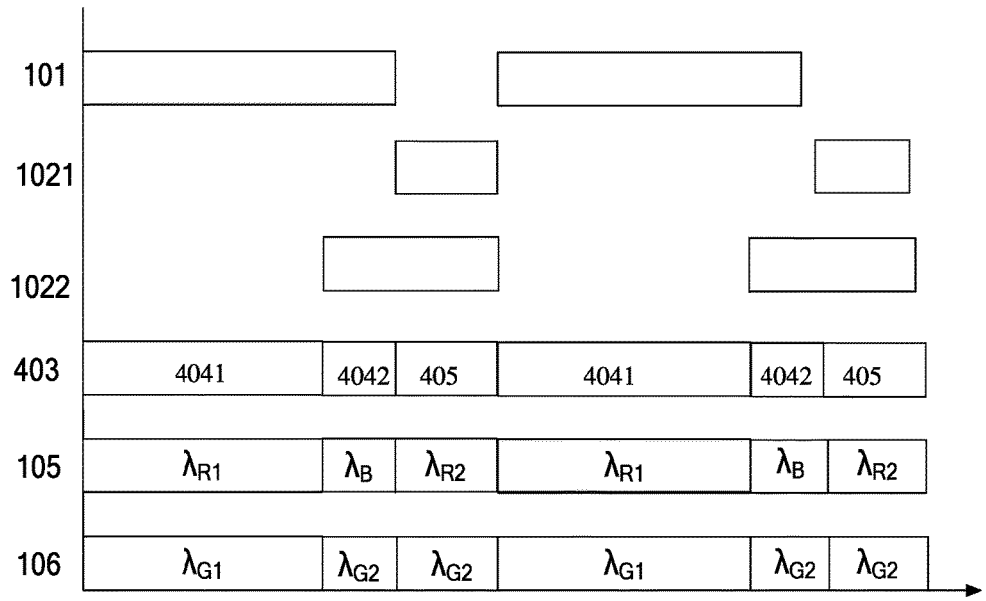
FIG. 13 is another timing diagram of the excitation light source, compensation light sources, rotating color wheel, first light modulator, second light modulator and third light modulator of the fourth embodiment.

In another embodiment, the controller controls the excitation light source 101 to turn on during the first time intervals and the second time intervals and turn off during the third time intervals; controls the first compensation light source 1021 to turn on during the third time intervals and turn off during the first time intervals and the second time intervals; and controls the second compensation light source 1022 to turn on during the second time intervals and the third time intervals and turn off during the first time intervals. The timing sequence of the turning on and off of the excitation light source 101, the first compensation light source 1021 and the second compensation light source 1022, the timing sequence of the various segments of the rotating color wheel 103, and the timing sequence of the modulation of the first light modulator 105 and the second light modulator 106 are shown in FIG. 13.

Figure 14:
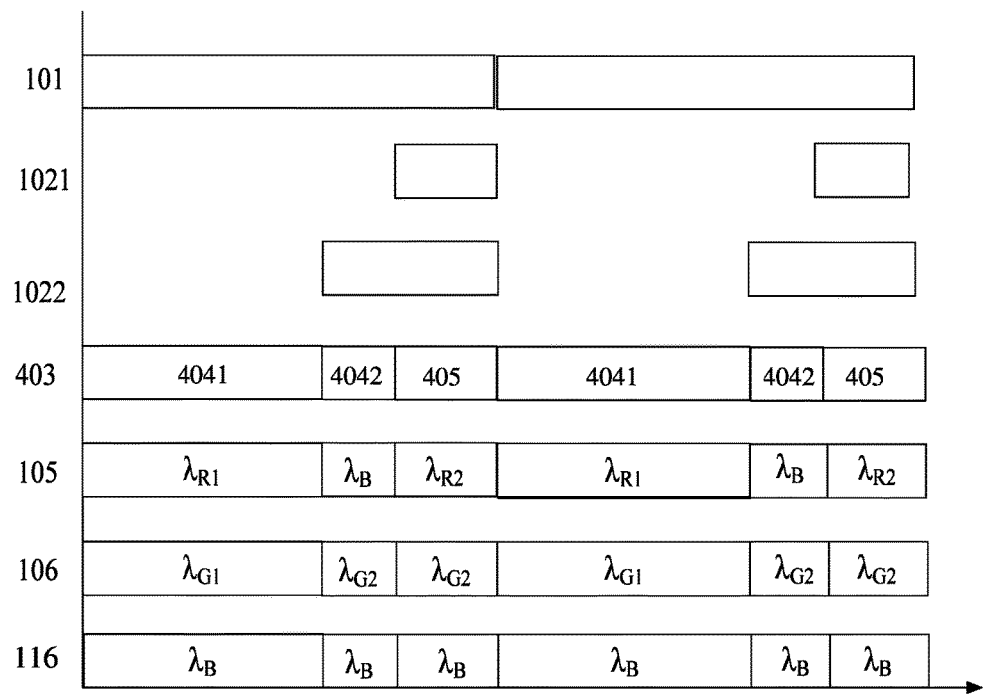
FIG. 14 is another timing diagram of the excitation light source, compensation light sources, rotating color wheel, first light modulator and second light modulator of the fourth embodiment.

In yet another embodiment, the controller controls the excitation light source 101 to turn on continuously. During the first time intervals, the light division system 104 divides the yellow light $\lambda_Y$ into the red light $\lambda_{R1}$ that travels along the first optical path and the green light $\lambda_{G1}$ that travels along the second optical path, and sends the excitation light $\lambda_B$ to travel along the a third optical path. During the second time intervals, the light division system 104 sends the transmitted excitation light $\lambda_B$ to travel along the first and third optical paths, and sends the second compensation light, i.e. the bluish-green light $\lambda_{G2}$, to travel along the second optical path. During the third time intervals, the light division system 104 sends the first compensation light, i.e. the red light $\lambda_{R2}$, to travel along the first optical path, sends the second compensation light, i.e. the bluish-green light $\lambda_{G2}$, to travel along the second optical path, and sends the transmitted excitation light $\lambda_B$ to travel along the third optical path. The light modulation system includes the first light modulator 105, the second light modulator 106, and the third light modulator 116. The first light modulator 105 modulates the lights traveling along the first optical path, the second light modulator 106 modulates the lights traveling along the second optical path, and the third light modulator 116 modulates the lights traveling along the third optical path; the modulation timing sequences are as shown in FIG. 14.

During the first time intervals, the excitation light $\lambda_B$ emitted by the excitation light source 101 sequentially passes through the collimating lens 111, the partially coated filter 107 and the collecting lens 112 to be incident on the phosphor segment 4041 of the rotating color wheel 403. The yellow phosphor material on the phosphor segment 4041 absorbs the excitation light $\lambda_B$ to generate a yellow converted light $\lambda_Y$. The yellow light $\lambda_Y$ is reflected by the partially coated filter 107 and the reflecting mirror 108 into the light division system 104. During the second time intervals, the excitation light $\lambda_B$ emitted by the excitation light source 101 is incident on the transparent segment 4042 of the rotating color wheel 403. This excitation light, i.e. the blue light $\lambda_B$, passes through the rotating color wheel 403, and is reflected by the dichroic mirrors 114 and 115 into the light division system 104. Also, during the second time intervals, the second compensation light $\lambda_{G2}$ generated by the second compensation light source 1022 passes through the dichroic mirror 114 to be incident on the transparent segment 4042 of the rotating color wheel 403. The second compensation light $\lambda_{G2}$ passes through the rotating color wheel 403, and is reflected by the partially coated filter 107 and the reflecting mirror 108 into the light division system 104. During the third time intervals, the first compensation light $\lambda_{R2}$ generated by the first compensation light source 1021 and the second compensation light $\lambda_{G2}$ generated by the second compensation light source 1022 are incident on the second region 405 of the rotating color wheel 403. They are transmitted by the second region 405, and then incident on the partially coated filter 107. The first compensation light, i.e. the red light $\lambda_{R2}$, and the second compensation light, i.e. the bluish-green light $\lambda_2$, are reflected by the partially coated filter 107 and the reflecting mirror 108 into the light division system 104.

Figure 15:
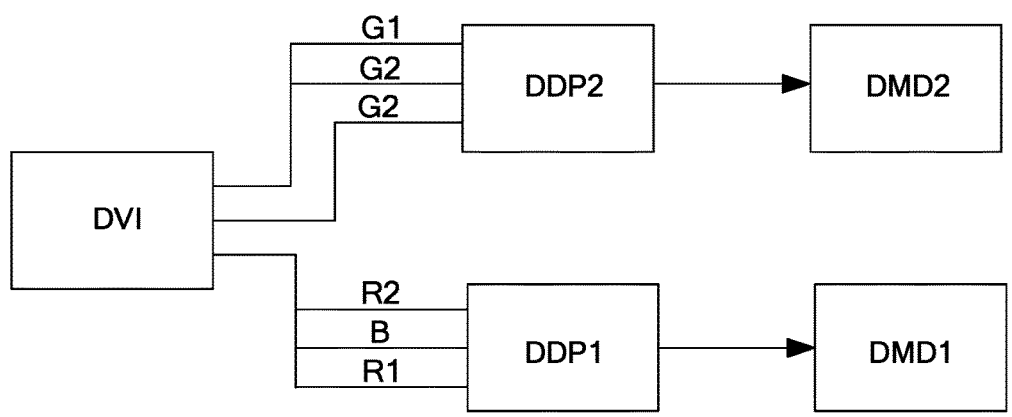
FIG. 15 schematically illustrates another control principle of the first light modulator and second light modulator of the fourth embodiment.

During the first time intervals, the light division system 104 divides the yellow light $\lambda_Y$ into the red light $\lambda_{R1}$ that travels along the first optical path and the green light $\lambda_{G1}$ that travels along the second optical path, so that the first light modulator 105 modulates the red light $\lambda_{R1}$ and the second light modulator 106 modulates the green light $\lambda_{G1}$. During the second time intervals, the light division system 104 sends the reflected excitation light, i.e. the blue light $\lambda_B$, to travel along the first optical path, and sends the second compensation light, i.e. the bluish-green light $\lambda_{G2}$, to travel along the second optical path, so that the first light modulator 105 modulates the blue light $\lambda_B$ and the second light modulator 106 modulates the bluish-green light $\lambda_{G2}$. During the third time intervals, the light division system 104 sends the first compensation light, i.e. the red light $\lambda_{R2}$, to travel along the first optical path, and sends the second compensation light, i.e. the bluish-green light $\lambda_{G2}$, to travel along the second optical path, so that the first light modulator 105 modulates the red light $\lambda_{R2}$ and the second light modulator 106 modulates the bluish-green light $\lambda_{G2}$. The modulated blue light $\lambda_B$, red light $\lambda_{R1}$, green light $\lambda_{G1}$, red light $\lambda_{R2}$, and bluish-green light $\lambda_{G2}$ are combined to form the image which is projected onto a screen by a projection lens 113. The control methods for the first light modulator 105 and the second light modulator 106 are shown in FIG. 15. In the light source system of this embodiment, the first compensation light compensates the red color gamut, and the second compensation light compensates the green color gamut. Further, the compensation lights are not illuminated on the phosphor material, but are directly transmitted. Thus, while correcting the color gamut of the projected image, the scattering loss of the compensation lights is also reduced, so that the utilization efficiency of the compensation lights is increased.

The various embodiments of the invention are described in this disclosure in a progressive manner, and the description of each embodiment focuses on its differences with other embodiment. The similar aspects of the various embodiments can be understood by referring to each other. For the devices of the various embodiment, the corresponding methods may correspond to the methods of other embodiments, so their descriptions are simplified, and their similar aspects can be understood by referring to each other.

The embodiments are described above to enable those skilled in the art to make and use the invention. It will be apparent to those skilled in the art that various modification and variations can be made in the systems and related method of the present invention, and the principles described here can be realized in other embodiments without departing from the spirit or scope of the invention. Thus, it is intended that the present invention cover modifications and variations that come within the scope of the appended claims and their equivalents.

What is claimed is:

1. A light source system, comprising:
    an excitation light source for emitting an excitation light during at least first time intervals and second time intervals;
    a compensation light source for emitting a compensation light during at least third time intervals, the compensation light emitted by the compensation light source being a laser light including at least one color;
    a rotating color wheel disposed on light paths of both the excitation light and the compensation light, including at least a first region and a second region, the first region including at least a wavelength conversion segment carrying a wavelength conversion material, wherein during the first time intervals and the second time intervals, the first region is illuminated by the excitation light and outputs a light sequence including at least two colors, and wherein during the third time intervals, the second region transmits the compensation light;
    wherein the light including the at least two colors includes at least a broad band fluorescent light generated by the wavelength conversion segment when illuminated by the excitation light, and wherein the at least one color laser light compensates for the fluorescent light or lights divided from the fluorescent light.

2. The light source system of claim 1, wherein a spectral range of the at least one color laser light overlaps partly with a spectral range of the fluorescent light, and wherein the spectral range of the fluorescent light is 480-700 nm.

3. The light source system of claim 2, wherein the compensation light source includes a first compensation light source and a second compensation light source, the first compensation light source emitting a first compensation light, and the second compensation light source emitting a second compensation light.

4. The light source system of claim 3, further comprising a controller, which controls the excitation light source to turn on during the first time intervals and the second time intervals and turn off during the third time intervals, and controls the compensation light source to turn on during the third time intervals and turn off during the first time intervals and the second time intervals.

5. The light source system of claim 4, wherein the wavelength conversion segment is a phosphor segment, wherein the first region further includes a reflective segment, wherein during the first time intervals, the reflective segment reflects the excitation light, wherein during the second time intervals, the phosphor segment generates a yellow converted light under illumination of the excitation light, and wherein during the third time intervals, the second region transmits the first compensation light and the second compensation light.

6. The light source system of claim 5, wherein the phosphor segment is a segment carrying a yellow phosphor material, the reflective segment is a segment carrying a scattering powder, and the second region is a transmission type diffusion segment.

7. The light source system of claim 6, wherein the excitation light source and the compensation light source are respectively disposed on two sides of the rotating color wheel, the light source system further comprising at least one partially coated filter, disposed between the excitation light source and the rotating color wheel, for reflecting the excitation light, the fluorescent light and the compensation light.

8. The light source system of claim 3, further comprising a controller, the controller controlling the excitation light source to either turn on during the first time intervals and the second time intervals and turn off during the third time intervals, or to turn on continuously; the controller further controlling the first compensation light source to turn on during the third time intervals and turn off during the first time intervals and the second time intervals, and controlling the second compensation light source to turn on during the second time intervals and the third time intervals and turn off during the first time intervals; or, the controller controlling the second compensation light source to turn on during the third time intervals and turn off during the first time intervals and the second time intervals, and controlling the first compensation light source to turn on during the second time intervals and the third time intervals and turn off during the first time intervals.

9. The light source system of claim 8, wherein the excitation light source and the compensation light source are respectively disposed on two sides of the rotating color wheel, the light source system further comprising at least one partially coated filter and a dichroic mirror, the partially coated filter being disposed between the excitation light source and the rotating color wheel, for reflecting the fluorescent light and the compensation light, and the dichroic mirror being disposed between the compensation light source and the rotating color wheel, for transmitting the compensation light and reflecting the excitation light.

10. The light source system of claim 9, wherein the first region includes a phosphor segment and a transparent segment, wherein during the first time intervals, the phosphor segment is illuminated by the excitation light to generate a yellow light, wherein during the second time intervals, the transparent segment transmits the excitation light and the first compensation light, or, during the second time intervals, the transparent segment transmits the excitation light and the second compensation light, and wherein during the third time intervals, the second region transmits the first compensation light and the second compensation light.

11. The light source system of claim 10, wherein the phosphor segment is a segment that carries a yellow phosphor material, and the transparent segment and the second region are transmission type diffusion segments.

12. The light source system of claim 7, wherein the excitation light is a blue light, the first compensation light is a red light, and the second compensation light is a blueish-green light.

13. A projection system, comprising:
the light source system of claim 1;
a light division system for separating different color lights into lights that travel along a plurality of different optical paths, wherein the compensation light and the corresponding color light travel along a same optical path; and
a light modulating system including a plurality of light modulators, the plurality of light modulators corresponding one-to-one with the respective optical paths, for modulating lights traveling along the plurality of optical paths.

14. The projection system of claim 13, wherein the first region includes a phosphor segment and a reflective segment, wherein during the first time intervals, the light division system sends the reflected excitation light to travel along a second optical path, wherein during the second time intervals, the light division system divides the yellow light into a red light that travels along a first optical path and a green light that travels along the second optical path, and wherein during the third time intervals, the light division system sends the first compensation light to travel along the first optical path and sends the second compensation light to travel along the second optical path.

15. The projection system of claim 13, wherein the first region includes a phosphor segment and a transparent segment, wherein the first compensation light source is turned on during the second time intervals and the third time intervals, wherein during the first time interval, the light division system divides the yellow light into a green light that travels along a first optical path and a red light that travels along a second optical path, wherein during the second time intervals, the light division system sends the first compensation light to travel along the second optical path and sends the transmitted excitation light to travel along the first optical path, and wherein during the third time intervals, the light division system sends the first compensation light to travel along the second optical path and sends the second compensation light to travel along the first optical path.

16. The projection system of claim 13, wherein the first region includes a phosphor segment and a transparent segment, wherein the second compensation light source is turned on during the second time intervals and the third time intervals, wherein during the first time interval, the light division system divides the yellow light into a red light that travels along a first optical path and a green light that travels along a second optical path, wherein during the second time intervals, the light division system sends the transmitted excitation light to travel along the first optical path and sends the second compensation light to travel along the second optical path, and wherein during the third time intervals, the light division system sends the first compensation light to travel along the first optical path and sends the second compensation light to travel along the second optical path.

17. The projection system of claim 14, wherein the light modulating system includes a first light modulator and a second light modulator, wherein the first light modulator is disposed to modulate lights traveling along the first optical path and the second light modulator is disposed to modulate lights traveling along the second optical path.

18. The projection system of claim 13, wherein the first region includes a phosphor segment and a transparent segment, wherein the first compensation light source is turned on during the second time intervals and the third time intervals, wherein during the first time interval, the light division system divides the yellow light into a green light that travels along a first optical path and a red light that travels along a second optical path and sends the excitation light to travel along a third optical path, wherein during the second time intervals, the light division system sends the first compensation light to travel along the second optical path and sends the transmitted excitation light to travel along the first optical path and the third optical path, and wherein during the third time intervals, the light division system sends the first compensation light to travel along the second optical path, sends the second compensation light to travel along the first optical path, and sends the transmitted excitation light to travel along the third optical path.

19. The projection system of claim 13, wherein the first region includes a phosphor segment and a transparent segment, wherein the second compensation light source is turned on during the second time intervals and the third time intervals, wherein during the first time interval, the light division system divides the yellow light into a red light that travels along a first optical path and a green light that travels along a second optical path and sends the excitation light to travel along a third optical path, wherein during the second time intervals, the light division system sends the transmitted excitation light to travel along the first optical path and the third optical path and sends the second compensation light to travel along the second optical path, and wherein during the third time intervals, the light division system sends the first compensation light to travel along the first optical path, sends the second compensation light to travel along the second optical path, and sends the transmitted excitation light to travel along the third optical path.

20. The projection system of claim 18, wherein the light modulating system includes a first light modulator, a second light modulator and a third light modulator, wherein the first light modulator is disposed to modulate lights traveling along the first optical path, the second light modulator is disposed to modulate lights traveling along the second optical path, and the third light modulator is disposed to modulate lights traveling along the third optical path.

* * * * *